Feb. 28, 1933.   M. SCHLEICHER   1,899,425
ELECTRICAL PROTECTIVE SYSTEM
Filed April 23, 1927
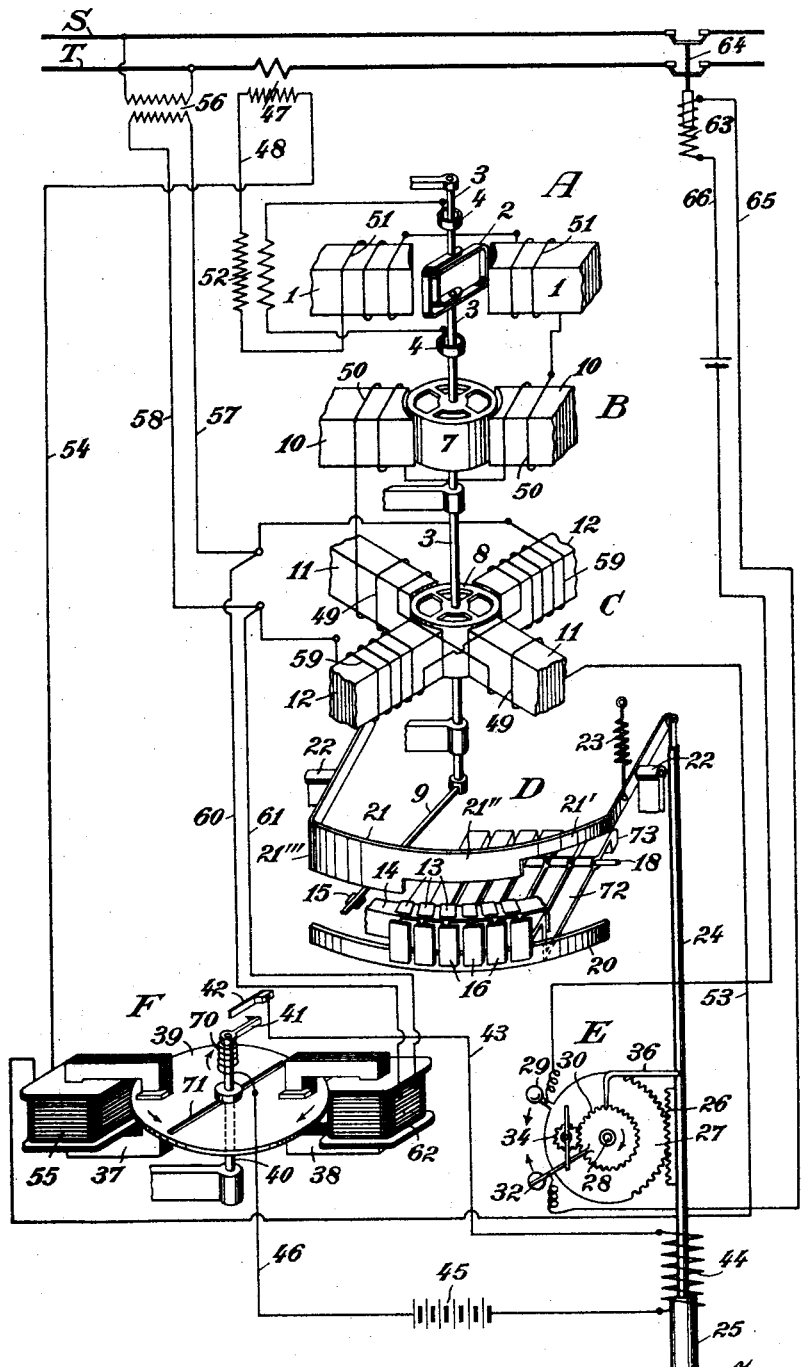
Inventor:
Manfred Schleicher
by [signature]
Atty.

Patented Feb. 28, 1933

1,899,425

UNITED STATES PATENT OFFICE

MANFRED SCHLEICHER, OF BERLIN-CHARLOTTENBURG, GERMANY, ASSIGNOR TO SIEMENS & HALSKE AKTIENGESELLSCHAFT, OF BERLIN-SIEMENSSTADT, GERMANY

ELECTRICAL PROTECTIVE SYSTEM

Application filed April 23, 1927, Serial No. 186,143, and in Germany April 24, 1926.

My invention relates to electrical instruments and more especially to a fault-location test relay in which a line section is tested by measuring the quotient between the voltage and the current therefor, that is, the resistance, of the line.

It has already been proposed to utilize measurements of this kind directly for cutting out faulty sections as also for indicating the distance of the fault from the instrument. However the measuring instruments required are in the majority of cases not suitable for operating contacts or other auxiliary apparatus, for they should operate exactly and reliably not only at high values of intensity and voltage, but also, and this is particularly important, at very low values. With such values, however, the instruments can develop only a small turning moment or couple, and it has already been proposed to provide auxiliary apparatus in combination with the quotient measuring instrument by which an auxiliary force is cut in when a fault occurs in the section.

My invention relates more particularly to apparatus of this latter kind and is based on the following principle: As soon as the quotient between a function of the voltage and a function of the current intensity falls below a given minimum value, the rotary system of a first quotient measuring instrument or relay develops a couple which either releases an auxiliary force or constitutes itself the auxiliary force, while the rotary system of a second measuring instrument assumes the position of equilibrium which corresponds to the reduced quotient and controls the auxiliary force released by the first rotary system. Thus the first quotient measuring instrument is not required to furnish exact indications, but a couple which is large enough for closing electrical contacts or for starting mechanical operations. This condition can be fulfilled by comparatively simple and inexpensive means. The second measuring instrument, on the other hand, can make exact indications and thereby provides that the operations for protecting the section will be performed at the point and only at the point where the fault has occurred. The exactness of indications will be the greater as the measuring instrument need not develop a larger couple than is required for moving its own indicator.

In the drawing affixed to this specification and forming part thereof a fault-location test relay embodying my invention is illustrated in perspective and diagrammatically by way of example.

Referring to the drawing, F is the first measuring instrument or quotient relay. 39 is its Ferraris disc, and 37 and 38 are two electromagnets provided with short-circuiting rings and acting on the disc. A slot 71 is provided in the disc 39 to prevent undesired mutual influencing of the two magnet fields. 55 is a current coil for the electromagnet 37, and 62 is a voltage coil for the electromagnet 38. 40 is the shaft of the Ferraris disc 39, 41 is a contact arm on shaft 40, 42 is a stationary contact adapted to cooperate with the contact arm 41, and 70 is a coil spring tending to move the contact arm 41 away from the stationary contact 42.

The field of the voltage magnet 38 generates a couple acting in the same direction as the spring 70, as indicated by the arrows, and this couple, in cooperation with the spring 70, tends to hold the contact arm 41 away from the stationary contact 42 against the couple of the current magnet 37 which acts in opposite direction and tends to throw the contact arm 41 in with the contact 42. However, when the quotient aforesaid, that is, the resistance, falls below a certain value the supply of current to the voltage coil 62 will be reduced and the supply to the current coil 55 will generally be increased so that the couple of its electromagnet 37 will overcome the opposed couple of the electromagnet 38 and will close the contact 41, 42. 45 is a battery and 43 and 46 are wires connecting the battery with the stationary contact 42 and the contact arm 41 through the medium of the spring 70, respectively. When the contacts are closed the battery current will flow in a coil 44 which attracts an iron core 25 on a rod 24 and thereby starts operations which will be described further below.

The second measuring instrument comprises three rotary systems A, B, C. The system A comprises a current magnet 1 and a rotary armature 2 which is constituted by one and a half windings, preferably of aluminium. 3 is a shaft on which the coil is secured and 4, 4 are mercury contacts supplying current to the armature 2. The second system B comprises current magnets 10, 10 and a Ferraris cylinder 7 which is also secured on the shaft 3. The third system C comprises a pair of current magnets 11, a pair of voltage magnets 12, and a Ferraris cylinder 8 on the shaft 3 rotating in the common field of the magnets. Stationary iron cores (not shown) are inserted in each Ferraris cylinder 7 and 8 for the purpose of reducing the resistance of the magnetic flux paths. 9 is an indicator on the lower end of the shaft which is free as a rule to rotate and the position of which corresponds directly to the resistance of the section S, T.

It will be understood that the couple generated by the current armature 2 is a function of the current intensity, squared, and that the couple generated by the Ferraris cylinder 8 is a function of the product from voltage and current intensity, and it is known that under the action of these couples the indicator 9 will be set to an angle which is a direct function of the quotient of the voltage and the current intensity, that is, a function of the resistance in the section to be surveyed. Preferably the arrangement is such that the indicator 9 indicates the reactance. The Ferraris cylinder 7 in the system B does not generate a couple at all, but has for its object merely to damp the movements of the systems A and C with a force which increases in proportion to the current intensity.

21 is a depressing bar arranged above the path of the indicator 9, 22, 22 are trunnions about which it rotates, and 23 is a spring tending to lift the bar. The rod 24 with the iron core 25 of the coil 44 is pivotally connected to the free end of the bar 21. When the core 25 is attracted by its coil 44, the bar 21 will be depressed against the pull of the spring 23 until it strikes the indicator 9 and forces it down on a support 14.

The edge of bar 21 is stepped at 21', 21" and 21''', and the effective motion of the bar with respect to the indicator 9 will vary in accordance with the position of the indicator with respect to its steps. If the section to be surveyed and the section adjoining same are in order, the resistance is considerable and the indicator will be opposite the highest step 21''' of the bar so that the angle through which the bar 21 is free to rock on its trunnions 22, 22 is practically nil. On the other hand, if a fault, for instance a short circuit, occurs in the section to be surveyed, the resistance will be small and the indicator will move to the opposite end of its stroke, that is, into reach of the lowest step 21' of the bar 21, so that the bar is permitted to perform its maximum rocking motion. With a fault in the adjacent section the indicator 9 will be in reach of the medium step 21" of the bar and the bar will be permitted to rock through a medium angle.

26 is a rack secured on the rod 24, 27 is a pinion meshing with the rack, 28 is the shaft of the pinion and 30 is a gear also mounted on the shaft 28 and which meshes with the pinion 34 of a driving mechanism (not shown). 36 is a ratchet tooth carried on the rod 24 and adapted to engage between the teeth of the gear 30. When the rod 24 moves upwards, the ratchet tooth 36 is disengaged from the gear wheel 30 which is now free to be rotated by the pinion 34 of the driving mechanism.

29 is a contact on the pinion 27 and 32 is a contact on the gear wheel 30 which closes a circuit, (not shown) when it strikes the contact 29. When a short circuit occurs in the section to be surveyed, the indicator 9 will be in reach of the lowest step 21' and, upon the core 25 being attracted by the coil 44, the contact 29 will be moved toward the movable contact 32 to within a short distance thereof and after a short interval, say, one second, the contacts will close. When a fault occurs in the adjacent section, the indicator 9 is in reach of the medium step 21" of bar 21, and the distance, through which the contact 29 is moved toward the movable contact 32, will be smaller so that the contact will be closed only after a longer interval, say, two seconds. When the indicator 9 is within reach of the highest step 21''' of bar 21, the distance through which the contact 29 is moved toward the movable contact 32, will be practically nil. This contact will therefore attain the contact 29 either not at all or only after a long interval, say three seconds. The operation of the switches after three seconds might be effected in case of failure of the oil switches of the line where the fault has occurred.

The wires S, T of the section to be surveyed are shown for the sake of simplicity as parts of a monophase line with supply and return wires, 47 is a current transformer in the wire T which serves for feeding the current coil 51 of the system A through a wire 48, and also the current coils 50 and 11 of the systems B and C, and, through the wire 53, the current coil 55 of the electro-magnet 37 in the instrument F. 54 is a return wire connecting the coil 55 with the current transformer 47. A separate small current transformer 52 is inserted in the wire 48 which excites the armature 2 at increased current intensity to enable it to exert a couple of sufficient magnitude. 56 is a voltage transformer also connected to the wires S and T which, through wires 57 and 58 feeds the voltage coil 59 of the system C and through wires 60, 61 also the voltage coil 62 of the electromagnet 38 in the instrument F.

64 is an oil switch for both wires S and T, 63 is its operating coil and 65, 66 are wires which are supplied with current when the contacts 29 and 32 are engaged.

It is not necessary that the measuring instrument or quotient relay F should indicate exactly all values of the resistance in the section, it being sufficient if it causes the contacts 41 and 42 to be closed when the resistance in the line is below a certain limit and develops a couple of sufficient magnitude. The exact indication of the location of the fault is the task of the indicator 9. When the fault is not within the section to be surveyed, the indicator 9 will prevent the operation of the oil switch 64 even if the instrument F has closed its contacts 41, 42.

Contacts 13 are arranged on the support 14 over which the indicator 9 is moving and these contacts are adapted to cooperate with a contact plate 15 on the indicator 9 and are preferably within reach of the step 21''' of the depressing bar 21. Each contact closes a circuit (not shown) when it is engaged by the contact plate 15 of the indicator 9, and these circuits may operate a remote indicating device.

Drop indicators 16 are provided and adapted to be operated by the indicator 9 when it is forced down onto one of the contacts 13 by the bar 21. The drop indicators are carried on double-armed levers 72 which are fulcrumed on a pin 18 and are provided with balance weights 73. They are moved against frictional resistance so as to be held in position after having been operated by the indicator so that they will indicate the location of the fault when the indicator 9 has moved to another position. The drop indicators are returned to operative position by hand.

I wish it to be understood that I do not desire to be limited to the exact details of construction shown and described, for obvious modifications will occur to a person skilled in the art.

I claim:—

1. Electrical means for supervising electric lines comprising two resistance responsive instruments, one arranged for exact, the other one for approximate operation, a switch releasing device arranged for cooperation with said exact instrument and means arranged to be actuated by said other instrument for actuating said switch releasing device.

2. Electrical means for supervising electric lines comprising two resistance responsive instruments one arranged for exact, the other one for approximate operation, means in said other instrument for returning its parts to their position of rest, a switch releasing device arranged for cooperation with said exact instrument and means arranged to be actuated by said other instrument for actuating said switch releasing device.

3. Electrical means for supervising electric lines comprising two resistance responsive instruments, one arranged for exact, the other one for approximate operation, a Ferraris disc and a current coil and a voltage coil in said other instrument arranged to influence said disc in opposite sense, a switch releasing device arranged for cooperation with said exact instrument and means arranged to be actuated by said other instrument for actuating said switch releasing device.

4. Electrical means for supervising electric lines comprising two resistance responsive instruments, one arranged for exact, the other one for approximate operation, a current coil in said exact instrument, a rotatable coil in the magnet field excited by said current coil, another current coil and a voltage coil in said exact instrument, and a Ferraris drum rotatable in the combined field of said other current coil and said voltage coil, a Ferraris disc and a current coil and a voltage coil in said other instrument arranged to influence said disc in opposite sense, a switch releasing device arranged for cooperation with said exact instrument and means arranged to be actuated by said other instrument for actuating said switch releasing device.

5. Electrical means for supervising electric lines comprising two resistance responsive instruments, an oscillatory bar in one of said instruments, a switch, a depressing bar adapted to release said switch, said depressing bar being dependent for its operation from the extent of oscillation of said oscillatory bar and means arranged to be actuated by the other instrument for operating said depressing bar.

6. Electrical means for supervising electric lines comprising two resistance responsive instruments, one arranged for exact, the other one for approximate operation, current-influenced means for damping said exact instrument, a switch releasing device arranged for cooperation with said exact instrument and means arranged to be actuated by said other instrument for actuating said switch releasing device.

7. Electrical means for supervising electric lines comprising two independently movable resistance-responsive instruments inserted in one and the same circuit, a switch-releasing device operatively associated with one of said instruments and an automatically active auxiliary device arranged to be actuated by the other instrument for actuating said switch-releasing device.

In testimony whereof I affix my signature.

MANFRED SCHLEICHER.